(No Model.) 2 Sheets—Sheet 1.

W. STARLEY & H. S. OWEN.
TANDEM BICYCLE.

No. 415,072. Patented Nov. 12, 1889.

Witnesses:
W. H. Mortimer.
N. R. Kennedy.

Inventor:
William Starley
H. S. Owen
By Phil T. Dodge
Attorney

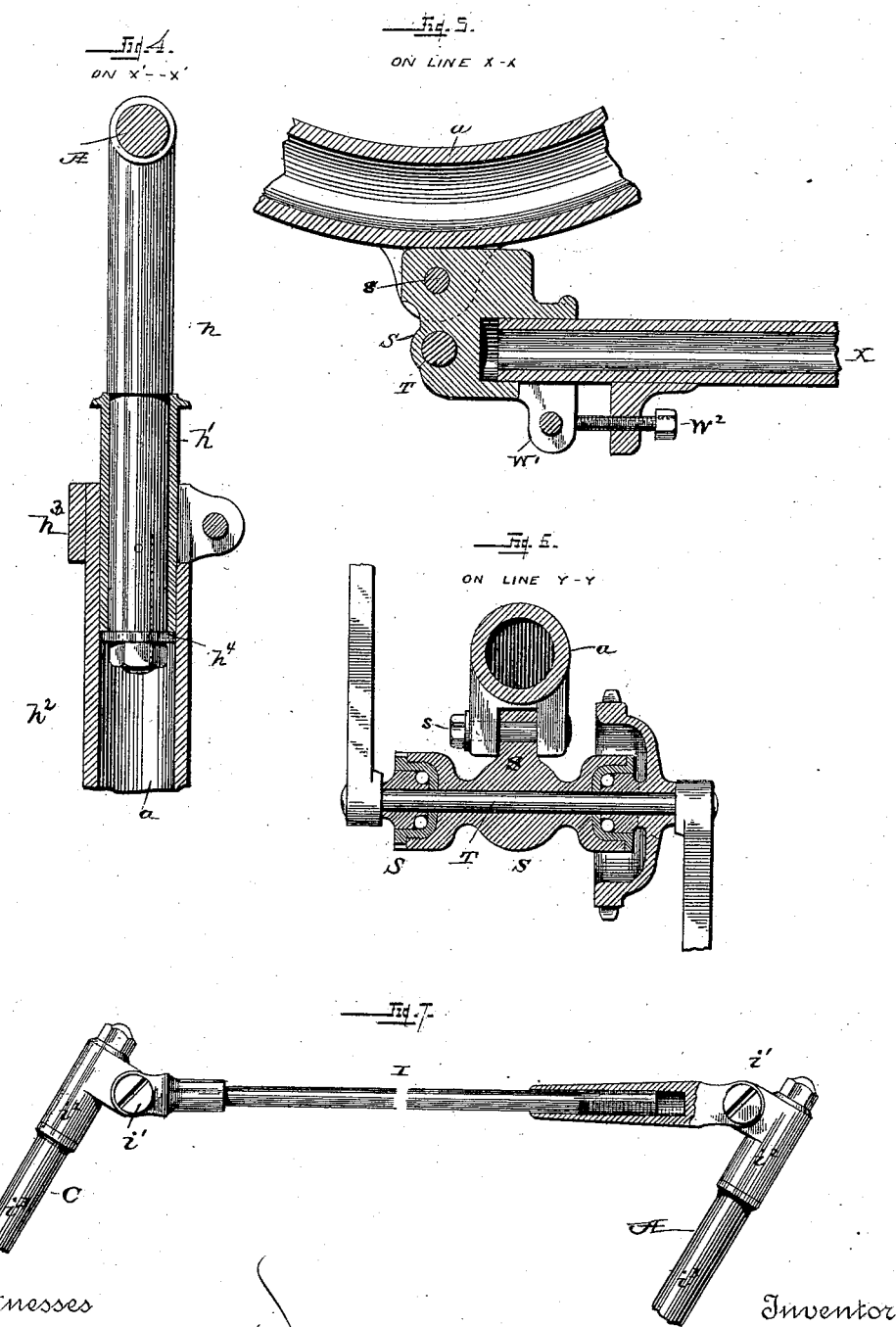

UNITED STATES PATENT OFFICE.

WILLIAM STARLEY, OF COVENTRY, ENGLAND, AND HERBERT S. OWEN, OF WASHINGTON, DISTRICT OF COLUMBIA.

TANDEM BICYCLE.

SPECIFICATION forming part of Letters Patent No. 415,072, dated November 12, 1889.

Application filed October 24, 1888. Serial No. 289,003. (No model.)

*To all whom it may concern:*

Be it known that we, WILLIAM STARLEY, of Coventry, England, and HERBERT S. OWEN, of Washington, in the District of Columbia, have invented certain Improvements in Tandem Bicycles, of which the following is a specification.

Figure 1:
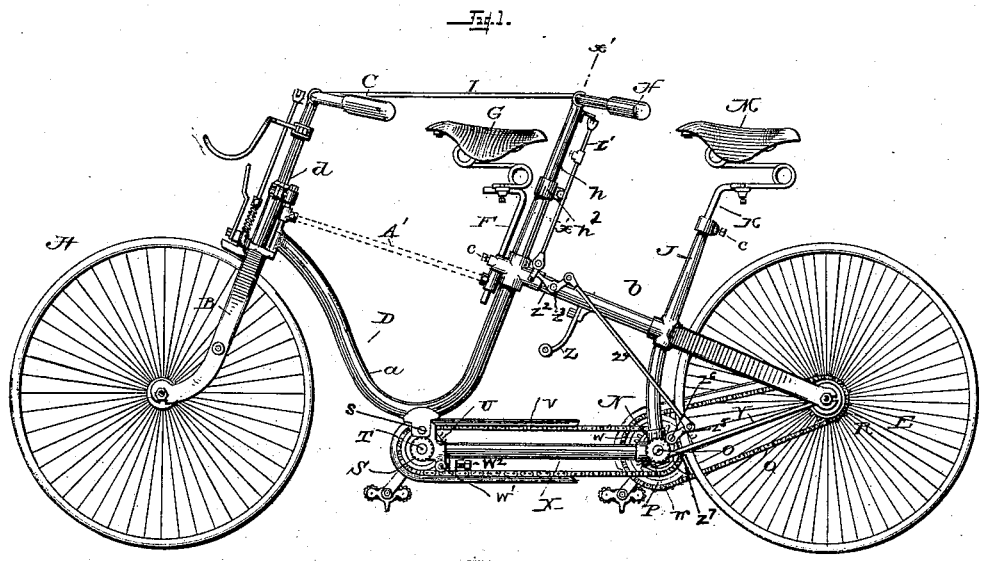
Figure 2:
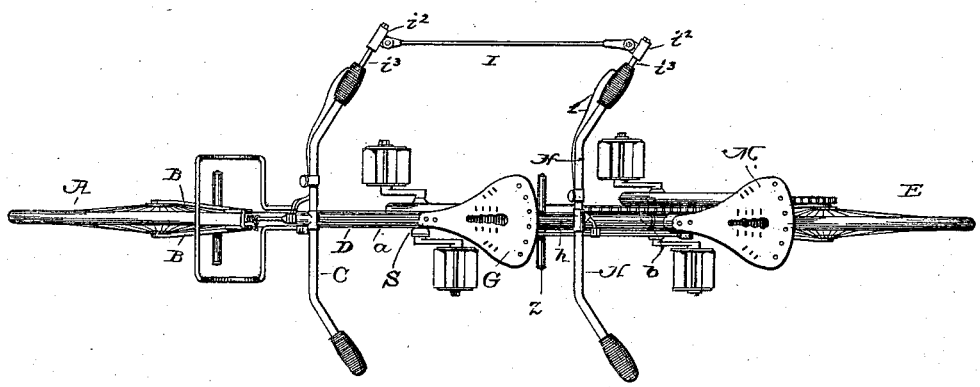
Figure 3:
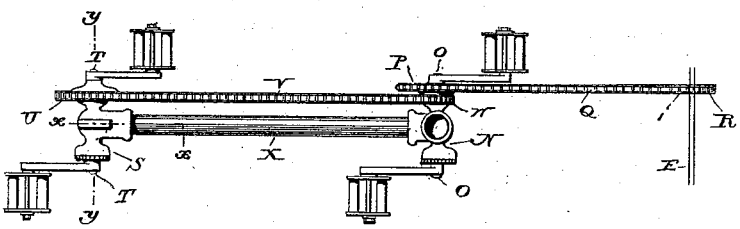

In the accompanying drawings, Figure 1 is a side elevation of the machine. Fig. 2 is a top plan view of the same. Fig. 3 is a diagram illustrating the arrangement of the driving-chains. Fig. 4 is a vertical section through the rear steering-shaft on the line $x'\ x'$, Fig. 1. Fig. 5 is a section on the line $x\ x$, Fig. 3. Fig. 6 is a section on the line $y\ y$, Fig. 3. Fig. 7 is a plan view, partly in section, showing the coupling between the steering-handles.

Referring to the drawings, A represents the front steering-wheel, having its axle mounted in the lower end of the steering-fork B, which is provided at the top with a transverse steering bar or handle C, secured rigidly thereto in any suitable manner. This fork is connected above the wheel by an upright axis or center to the forward end of the main frame D, which latter is sustained at its rear end by the driving-wheel E. At the forward end the frame is curved downward and rearward from the steering-center, and, rising again midway of its length, it is extended rearward in a forked shape to receive the axle of the rear wheel.

The frame may be built up in the form shown in any suitable manner; but it is the common practice to employ for the forward end a single piece of tubing $a$, curved upward at the forward end to the steering-center and curved upward at the rear end to receive the adjustable L-rod F or other support for the forward seat G. This upturned rear end of the part $a$ also receives and sustains an upright shaft $h$, which rotates freely therein, and which is provided at the upper end with the transverse steering bar or handle H, this handle being located, as shown, in rear of the forward seat. At one end the two steering-bars are connected by a horizontal rod I, pivoted or otherwise jointed to their ends in any suitable manner, this arrangement compelling the two handle-bars to maintain parallel positions and permitting the machine to be steered by either or both of the riders.

The rear portion of the frame $b$ has its rear end forked to receive the rear wheel, and its forward end made of tubular form and rigidly united by a T-coupling or equivalent connection to the upturned end of the member $a$. Just forward of the rear wheel a tubular standard J is passed through the rear member $b$ of the main frame and brazed or otherwise rigidly secured thereto. Its upper end receives within it the adjustable L-rod K, by which the rear seat M is sustained.

The lower depending end of the standard J is provided with transverse bearings N, which support a crank-shaft O, provided at its two ends with cranks and pedals, and also provided in one end with a sprocket-wheel P, connected by a chain Q to a sprocket-wheel R, affixed to the main driving-wheel E. To the forward portion $a$ of the frame, at its lowest point, directly beneath the forward saddle, is secured a bearing S, which sustains a transverse shaft T, provided at its two ends with cranks and pedals, and also provided on one end with a sprocket-wheel U, which is connected by a chain V to a sprocket-wheel W on the rear crank-shaft.

It is to be noted that the bearing S is connected to the frame by a transverse pivot-bolt $s$, as shown in Figs. 1, 5, and 6. This is advantageous in that it prevents the springing or bending of the frame, which occurs chiefly in its depressed portion immediately above the bearing and throwing the bearing forward or backward, so as to change the tension of the forward chain.

It will be observed that power applied to the forward shaft is transmitted thence to the rear shaft and communicated from the latter to the rear wheel, the power applied to the rear shaft being also transmitted to the wheel by the same chain Q.

On reference to Fig 3 it will be seen that the two chains are located on the same side of the machine or at the same end of the shaft O. Now the strain of the forward chain tends to urge the shaft forward, while the strain of the rear chain tends to urge it backward. In consequence of this fact the forward and backward strains counteract or neutralize each other, so that there is little side strain upon the shaft O in its bearings. The arrangement entirely overcomes the serious difficulties which are commonly encountered in this type of machine by reason of the shafts being turned at one end against their bearings with great pressure, which usually results in excessive wear of the bearings and in the parts being thrown out of alignment.

A brace X, preferably tubular, is extended forward from the rear shaft-bearing at the lower end of the standard J to the bearing S, which supports the forward shaft T. The forward end of the brace X is seated to slide endwise in the shaft-bearing S, which is slotted and provided with a transverse bolt W', by which it may be contracted to firmly grasp the brace. A bolt $W^2$, lying lengthwise of the brace, passing through a stud on its under side, acts against the rear side of the bearing to force the brace rearward in relation thereto. The effect of this adjustment is to increase the distance between the two bearings and thereby increase the tension of the forward chain V. One or more brace-rods Y are extended from the bearings of the rear shaft to the rear end of the frame, being connected at their forward ends to the bearings by adjusting-nuts $w$, as shown, or by equivalent adjusting devices. These braces serve not only to give rigidity to the structure, but also to regulate the tension of the rear chain.

It is to be observed that the above-described devices admit of the tension of the front and the rear chains being regulated independently, and that the interposition of the braces X and Y between the front bearing and the driven wheel holds the forward bearing to its place and prevents the frame from being weakened or bent by the strains of the chains when in action.

Each of the seat-sustaining rods F and K is adjustable vertically in its support, each rod being confined by a set-screw $c$ or its equivalent.

It will be observed that the rod K, which sustains the rear seat, is bent rearward at its upper end, so as to overhang the rear wheel and sustain the rear saddle over the forward part of the wheel. The rod F, which supports the forward saddle, is, on the contrary, projected forward at its upper end, in order that the said saddle may be sustained at a suitable distance in advance of the rear steering-bar.

The upper ends of the seat-supports are extended horizontally, and the seat-sustaining springs may be adjustable in a fore-and-aft direction thereon, as usual in other machines.

The rear steering-shaft $h$ is seated at its lower end in a sleeve $h'$, in which it is free to turn. The sleeve is inserted in the upper slotted end of the post or standard $h^2$, which is encircled by a contracting ring or collar $h^3$, by means of which the standard may be caused to firmly embrace the sleeve. The steering-shaft is provided with a sustaining-shoulder, which rests on top of the sleeve $h'$, and is prevented from rising out of the sleeve by a washer $h^4$, bolted to its lower end and bearing beneath the sleeve, as shown. By adjusting the sleeve vertically in the standard the rear steering-bar may be raised or lowered, as desired. It will be seen that provision is thus made for adjusting the seats in relation to the pedals, as may be demanded by the length of limb of the riders, and provision is also made for independently adjusting the two steering bars or handles, as may be required.

The foot-rest Z is attached to and depends from the rear member $b$ of the frame forward of the rear seat and in suitable position to receive the foot of its occupant.

It is to be particularly noticed that in our machine both seats are located between lines falling vertically through the axes of the wheels, or, in other words, are inside of the wheel-base, so that the machine may be used with safety by a single rider occupying either of the seats. It will also be noticed that the forward portion of our frame affords an open unobstructed space for the skirts of female riders, and that this open or bent portion of the frame is greatly strengthened and stiffened by the brace X.

As one steering-handle may at times require to be adjusted vertically in relation to the other, which would change the distance between them, we prefer to construct the connecting-rod at its ends with forked heads connected by vertical pivots $i'$ to sleeves $i^2$, swiveling on the arms $i^3$, projecting from the ends of the handles, as shown in Fig. 7, and to thread the end of the rod into one of these heads, so that by disconnecting the head from the handle-bar and turning it upon the rod the connection will be changed in length as required.

An adjustable brace A' may be extended across the forward dropped portion of the frame—that is to say, from a point at or near the steering-head to a point at or near the forward seat. As shown in the drawings, this brace is provided with eyes at its two ends, the forward end slipped over the steering head or center, and the rear end slipped over the rod which sustains the forward seat, each end being provided with and secured by a set-screw.

We commonly use in connection with the forward wheel a brake attached to the steering-fork and operated by a hand-lever, as represented in the drawings; but this feature forms no part of our invention. In order to give greater control of the machine, and particularly to enable the rear rider to check its advance, we also provide a brake acting on the rear wheel, as shown in Figs. 1 and 2. A hand-lever $z$, pivoted near one end to the rear steering-bar H, is jointed at its inner end near the vertical steering-shaft $h$ to the upper end of a rod $z'$. This rod is in turn pivoted at its lower extremity to one end of an elbow-lever $z^2$, pivoted at $z^3$ to the main frame. From the rear end of this lever $z^3$ a rod $z^4$ extends downward and rearward to a crank-arm $z^5$, fixed rigidly to one end of the horizontal rock-shaft $z^6$. This shaft is mounted, as shown, in the rear part of the main frame and carries a depending brake-arm or spoon $z^7$ in position to act on the periphery of the rear wheel. The operator, grasping the steering-handle H, raises the outer end of the lever $z^2$ with his fingers, the effect being to depress the rod $z'$, and, through the intermediate parts, force the brake against the wheel.

It will be observed that the peculiar connections above described admit of the rear brake being operated without interfering with the action of the rider's limbs or the steering-bar.

Having thus described our invention, what we claim is—

1. The frame for a tandem bicycle, comprising the U-shaped forward end, the forked rear end $b$, rigidly attached thereto, the standard J, the two shaft-bearings attached one to said standard and the other to the forward part of the frame, and a brace X between said bearings.

2. The main frame for a tandem bicycle, comprising the U-shaped forward member $a$, in one piece with the upright tubular rear end to admit the rear steering-shaft therein, the forked rear member $b$, attached rigidly to the upper end of the member $a$, to carry the rear wheel, and the standard J, fixed rigidly to and extending above and below the member $b$, as shown, to carry the rear seat and the rear shaft-bearing.

3. In a tandem bicycle, the main frame, the rear wheel therein, and the front steering-wheel and its supporting-fork, in combination with a rear steering-bar H, mounted on the frame and connected through intermediate parts with the front fork to turn the same, a hand-lever movable with said steering-bar, a brake mounted on the frame and acting on the periphery of the rear wheel, and connections, substantially as shown, from said lever to the brake, whereby the rear rider is enabled with one hand to control the distant steering-wheel and also to control the brake of the rear wheel.

4. In combination with the main frame, the rear wheel therein, the front wheel, its swiveled fork and steering-bar, the steering-bar H, having its shaft $h$ mounted in the frame, the connection between the two steering-bars, the pivoted brake acting on the rear wheel, the hand-lever $z$, rod $z'$, lever $z^2$, and the rod $z^3$, connecting the last-named lever with the brake.

5. In combination with the main frame having an upright tubular member, a vertically-adjustable sleeve or collar seated therein, and a steering-shaft H, provided with a steering-handle, said shaft mounted to turn freely in and sustained by a sleeve, substantially as shown, whereby the adjustment of the sleeve is caused to vary the height of the handle.

6. In combination with the tubular standard $x'$ and its contracting device, the vertically-adjustable non-rotating sleeve therein, the steering-shaft $h$, seated in the sleeve to turn freely and shouldered to rest thereon, and the fastening devices at the lower end to hold the shaft from rising out of the sleeve.

7. In a tandem bicycle, the main frame provided with the driving-wheel and the two pedal-shafts connected by sprocket-wheels and chains, in combination with the longitudinal brace extending from the rear end of the frame to the bearing of the rear shaft, and the longitudinally-adjustable brace lying between the shaft-bearings.

8. In a tandem bicycle, the main frame and the rear driving-wheel therein, in combination with the front and rear pedal-shafts, their bearings attached to the frame, the chains and pulleys connecting said shafts and also connecting the rear shaft to the driving-wheel, and braces extending respectively from a point at or near the axis of the main wheel to the rear shaft-bearing and from the latter to the front shaft-bearing, whereby both shafts are held at a proper distance from each other and from the driving-wheel.

9. In a tandem bicycle of the type herein shown, the main frame, the two pedal shaft-bearings, one fixed and the other pivoted to the frame, and an intermediate brace fixed to the bearings to keep the same in position, whereby the springing or bending of the frame is prevented from changing the distance between the bearings.

10. In a tandem bicycle, the main driving-wheel E and its sprocket-wheel, in combination with the two pedal-shafts provided with sprocket-wheels, the chain connecting the wheels of the two shafts, and the chain from the wheel of the rear shaft to the driving-wheel, said chains and their carrying-wheels being mounted all on one side of the machine, whereby the opposing strains of the two chains are caused to prevent excessive side pressure on the rear pedal-shaft.

11. In combination with the main frame and the two pedal-shaft bearings, the intermediate brace $x$, seated to slide in one of said bearings, and the adjusting-bolt $W^2$.

12. In a tandem bicycle, in combination with the pedal-shaft, the split bearing S, its contracting-bolt, the brace X, and its adjusting-bolt $W^2$.

In testimony whereof we hereunto set our hand, this 12th day of September, 1888, in the presence of two attesting witnesses.

WILLIAM STARLEY.
H. S. OWEN.

Witnesses:
EDSON B. OLDS,
J. W. WILLIAMS.